(12) United States Patent
Sjenar et al.

(10) Patent No.: US 11,459,024 B2
(45) Date of Patent: Oct. 4, 2022

(54) MULTIFUNCTIONAL STEERING COLUMN, TRANSPORTATION VEHICLE, AND METHOD FOR OPERATING A TRANSPORTATION VEHICLE

(71) Applicant: VOLKSWAGEN AG, Wolfsburg (DE)

(72) Inventors: Dzemal Sjenar, Wolfsburg (DE); Oliver Schulz, Braunschweig (DE)

(73) Assignee: Volkswagen AG

( * ) Notice: Subject to any disclaimer, the term of this patent is extended or adjusted under 35 U.S.C. 154(b) by 0 days.

(21) Appl. No.: 16/028,661

(22) Filed: Jul. 6, 2018

(65) Prior Publication Data
US 2019/0016376 A1 Jan. 17, 2019

(30) Foreign Application Priority Data
Jul. 11, 2017 (DE) .................. 10 2017 211 859.8

(51) Int. Cl.
*B62D 5/04* (2006.01)
*B62D 1/20* (2006.01)
*B62D 1/28* (2006.01)
*B62D 5/00* (2006.01)
*B62D 1/16* (2006.01)

(52) U.S. Cl.
CPC ........... *B62D 5/0478* (2013.01); *B62D 1/166* (2013.01); *B62D 1/20* (2013.01); *B62D 1/286* (2013.01); *B62D 5/003* (2013.01); *B62D 5/006* (2013.01); *B62D 5/0481* (2013.01)

(58) Field of Classification Search
CPC .............................. B62D 5/006; B62D 5/0478
See application file for complete search history.

(56) References Cited

U.S. PATENT DOCUMENTS

| 4,415,054 A | * | 11/1983 | Drutchas | B62D 5/0448 |
| | | | | 74/89.41 |
| 4,913,249 A | * | 4/1990 | Lang | B62D 5/0436 |
| | | | | 180/404 |

(Continued)

FOREIGN PATENT DOCUMENTS

| CN | 105358408 A | 2/2016 |
| CN | 105936292 A | 9/2016 |

(Continued)

OTHER PUBLICATIONS

Office Action for Chinese Patent Application No. 201810758588.5; dated Jul. 8, 2021.

(Continued)

*Primary Examiner* — Randell J Krug
(74) *Attorney, Agent, or Firm* — Barnes & Thornburg, LLP

(57) ABSTRACT

A multifunctional steering column for a transportation vehicle having a steering bracket for connection of the steering column to a transportation vehicle body of the transportation vehicle; a steering tube held on the steering bracket and which has a steering tube axis; a steering wheel connection for mechanical coupling of the steering column to a steering wheel; and a steering gear end at which a steering gear clutch with a steering gear connection for mechanical coupling to a steering gear of the transportation vehicle is arranged. Also disclosed is a transportation vehicle and a method for operating a transportation vehicle.

19 Claims, 8 Drawing Sheets

(56) References Cited

U.S. PATENT DOCUMENTS

| | | | |
|---|---|---|---|
| 5,835,870 A * | 11/1998 | Kagawa | B62D 6/00 |
| | | | 701/23 |
| 9,333,983 B2 | 5/2016 | Lathrop et al. | |
| 9,586,614 B2 * | 3/2017 | Izutani | B62D 5/001 |
| 9,683,639 B2 | 6/2017 | Kogure | |
| 9,751,555 B2 | 9/2017 | Sekiya | |
| 10,160,473 B2 * | 12/2018 | Bodtker | B62D 1/183 |
| 10,597,068 B2 * | 3/2020 | Steinkogler | B62D 5/006 |
| 10,633,013 B2 | 4/2020 | Kreutz et al. | |
| 2014/0200770 A1 | 7/2014 | Bahena et al. | |
| 2016/0258516 A1 * | 9/2016 | Kogure | B62D 5/043 |
| 2017/0029009 A1 | 2/2017 | Rouleau | |
| 2018/0319419 A1 * | 11/2018 | Kreutz | B62D 5/001 |

FOREIGN PATENT DOCUMENTS

| | | |
|---|---|---|
| CN | 206012708 U | 3/2017 |
| DE | 19645404 A1 | 8/1997 |
| DE | 19806458 A1 | 8/1998 |
| DE | 19859806 A1 | 7/2000 |
| DE | 10103667 A1 | 8/2002 |
| DE | 10302559 A1 | 9/2004 |
| DE | 102007002266 A1 | 7/2008 |
| DE | 102015204332 A1 | 9/2015 |
| DE | 102014117718 A1 | 6/2016 |
| DE | 102016110791 A1 | 12/2016 |
| DE | 102016111473 A1 | 12/2016 |
| DE | 102015225888 A1 | 6/2017 |
| EP | 0447626 A2 | 9/1991 |
| EP | 0974507 A2 | 1/2000 |
| EP | 3042825 A1 | 7/2016 |
| JP | 2004034751 A | 2/2004 |
| JP | 2004210200 A | 7/2004 |
| WO | 2017097662 A1 | 6/2017 |

OTHER PUBLICATIONS

Office Action for Chinese Patent Application No. 201810758588.5; dated Nov. 18, 2021.

* cited by examiner

MULTIFUNCTIONAL STEERING COLUMN, TRANSPORTATION VEHICLE, AND METHOD FOR OPERATING A TRANSPORTATION VEHICLE

PRIORITY CLAIM

This patent application claims priority to German Patent Application No. 10 2017 211 859.8, filed 11 Jul. 2017, the disclosure of which is incorporated herein by reference in its entirety.

SUMMARY

Illustrative embodiments relate to a multifunctional steering column for a transportation vehicle. Illustrative embodiments also relate to a transportation vehicle which is capable of autonomous driving and which has a steering column of the disclosed type and to a method for operating a transportation vehicle of the type.

BRIEF DESCRIPTION OF THE DRAWINGS

A disclosed embodiment of a multifunctional steering column for a transportation vehicle, of a disclosed transportation vehicle and a disclosed method will be discussed in more detail below on the basis of drawings, in which, in each case schematically.

DETAILED DESCRIPTION

Figure 1:
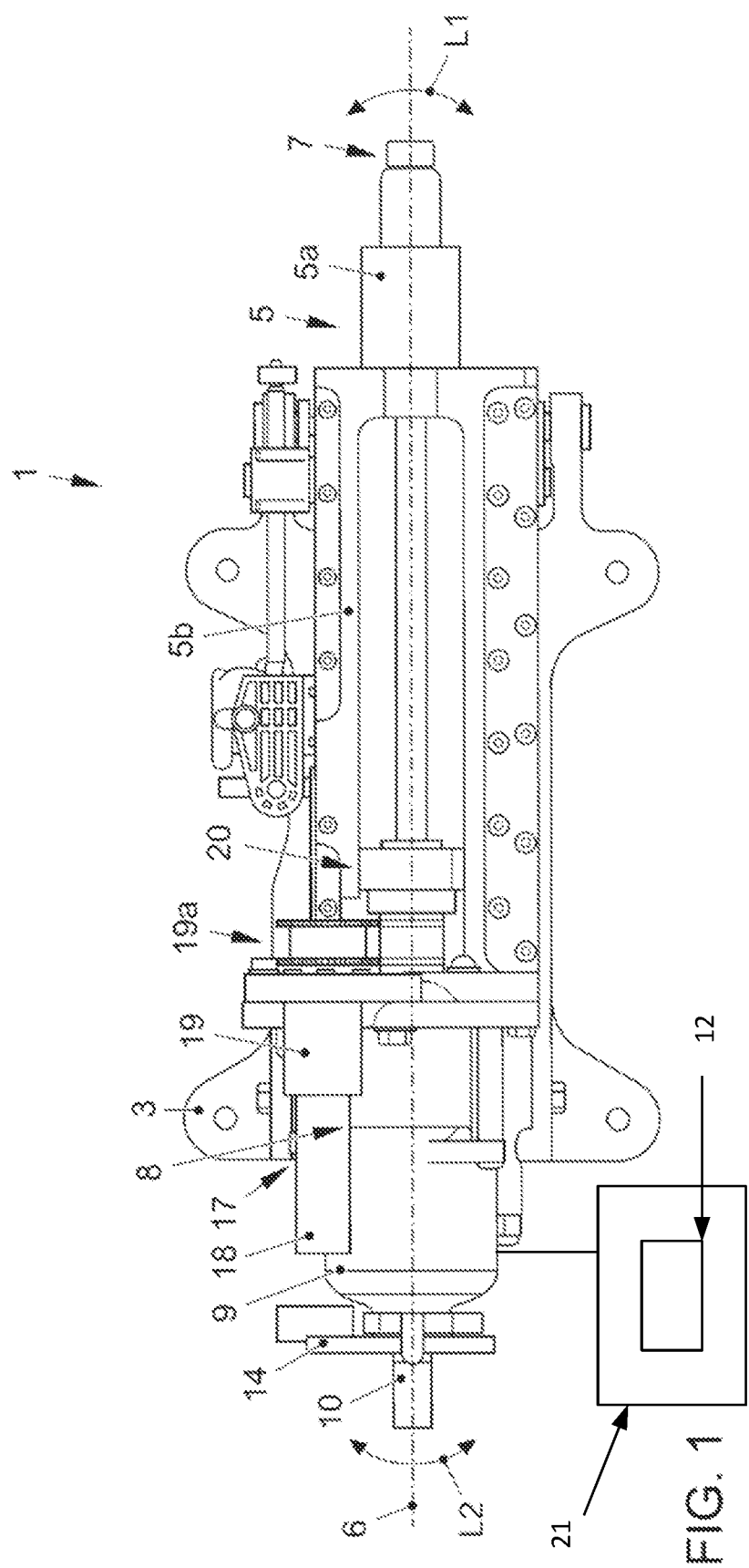
FIG. 1 shows a plan view from below of a disclosed embodiment of a multifunctional steering column.

In modern transportation vehicles, driver assistance systems are known which assist the driver of the transportation vehicle in certain situations, for example, during parking, during straight-ahead driving, during braking or during avoidance of obstructions. Among the known driver assistance systems, autonomous control systems play a particular role, because these are designed to perform the tasks of the driver for a relatively long period of time without interaction of the driver being necessary here. By use of an autonomous control system, the transportation vehicle can, under compliance with predefined legal standards, such as, for example, the German Road Traffic Act, be automatically navigated to a destination.

So that, during autonomous operation of the transportation vehicle, the driver is afforded the highest possible level of comfort or inadvertent steering by the driver is avoided, different steering columns have been developed. DE 10 2016 111 473 A1 has disclosed a steering wheel assembly for a transportation vehicle, in the case of which a steering wheel of the steering wheel assembly can be locked against rotation by a steering wheel locking component. Furthermore, a steering shaft of the steering wheel assembly can be locked against axial displacement by a steering shaft locking component. By use of a steering wheel assembly of the type, the steering wheel can be moved from an operating position into a rest position in which the steering wheel is, for example, recessed in an instrument panel. DE 10 2016 110 791 A1 likewise presents a steering wheel assembly which is designed for a transportation vehicle capable of autonomous operation, in the case of which the steering wheel is designed to be retractable into the instrument panel.

Known steering wheel assemblies have the drawback that a coupling of the steering wheel to the steering shaft is possible only in a neutral position. A coupling of the steering wheel during cornering or during a change in direction is not possible. This has the downside that a deactivation of the autonomous control system and a resumption of control over the transportation vehicle by the driver are possible only under certain conditions, and are thus not possible if the conditions are not met.

Disclosed embodiments provide a multifunctional steering column for a transportation vehicle, a transportation vehicle, and a method for operating a transportation vehicle, which do not have or at least partially do not have the drawback of the prior art. Disclosed embodiments provide a multifunctional steering column for a transportation vehicle, a transportation vehicle which is capable of autonomous operation and which has a steering column of the type, and a method for operating a transportation vehicle of the type, which improve a switchover from autonomous control to manual control in a simple and inexpensive manner.

Disclosed embodiments provide a multifunctional steering column, a transportation vehicle designed for autonomous driving, and a method for operating a transportation vehicle. Further features and details will emerge from the description and from the drawings. Here, features and details described in conjunction with the disclosed steering column self-evidently also apply in conjunction with the disclosed transportation vehicle and with the disclosed method and vice versa in each case, such that with regard to the disclosure reference is always or can always be made reciprocally to the individual properties of the disclosure.

Disclosed embodiments provide a multifunctional steering column for a transportation vehicle. The steering column has a steering bracket for connection of the steering column to a transportation vehicle body of the transportation vehicle, a steering tube which is held on the steering bracket and which has a steering tube axis, a steering wheel connection for mechanical coupling of the steering column to a steering wheel, and a steering gear end at which a steering gear clutch with a steering gear connection for mechanical coupling to a steering gear of the transportation vehicle is arranged. Moreover, the steering column has a first actuator device for adjusting a first steering angle of the steering wheel connection about the steering tube axis relative to the steering bracket, and a control device for controlling the first actuator device and the steering gear clutch. The steering gear clutch is designed for mechanical coupling of the steering tube to the steering gear of the transportation vehicle in a coupling position and for mechanical decoupling of the lower steering tube from the steering gear of the transportation vehicle in a decoupling position. The disclosed steering column has a first steering angle sensor for detecting the first steering angle of the steering wheel connection about the steering tube axis and has a second steering angle sensor for detecting a second steering angle of the steering gear connection about the steering tube axis.

The control device is designed to control the first actuator device such that the first steering angle is adapted to the second steering angle. The control device is furthermore designed to adjust the steering gear clutch into the coupling position if the first steering angle corresponds to the second steering angle.

In the context of the disclosure, a multifunctional steering column is to be understood to mean a steering column which is designed for multiple different steering modes. The steering column thus has several further functions aside from a direct transmission of a steering angle from the steering wheel to the steering gear. By use of the steering bracket, the steering column can be connected, for example, screwed, to the transportation vehicle body of the transportation vehicle. In this way, it can be ensured that the steering tube is held on the transportation vehicle body at a defined angle with respect thereto. The steering bracket may have an adjustment method or mechanism for adjustment of an angle of inclination of the steering tube relative to the transportation vehicle body. The adjustment mechanism may be automatically actuatable, and is furthermore controllable by the control device. The adjustment mechanism may have a self-locking configuration such that, when the adjustment means is not actuated, the angle of inclination of the steering tube is held constant.

The steering tube has, for example, the function of transmitting a first steering angle, which is predefined by the driver of the transportation vehicle by the steering wheel, to a steering gear of the transportation vehicle. The steering tube is rotatable relative to the steering bracket about the steering tube axis. A relative rotation of the steering tube with respect to the steering bracket is determined by the first steering angle. In the case of a steering wheel oriented for straight-ahead driving, the first steering angle is 0°. The steering tube is mechanically couplable by the steering wheel connection to a steering wheel. The steering wheel connection is arranged at or formed in a first end of the steering tube and has, for example, a toothing which can be placed in engagement with a corresponding toothing of the steering wheel to prevent a relative rotation of steering wheel with respect to the steering tube and to facilitate a correct orientation of the steering wheel with respect to the steering tube during the installation of the steering wheel. The steering gear end is formed at a second end, situated opposite the steering wheel connection, of the steering tube.

The steering gear clutch is arranged at the steering gear end and is connected thereto, for example, by screwing, pressing, clamping, welding or the like. A part of the steering gear clutch may also be formed integrally with the steering tube. The steering gear connection of the steering gear clutch is arranged at a side of the steering gear clutch pointing away from the steering tube. The steering gear connection is rotatable relative to the steering bracket by the second steering angle. The second steering angle may be proportional to a steering position of the wheels of the transportation vehicle. In the coupling position, the steering gear connection is mechanically coupled rotationally conjointly to the steering tube. The coupling position is provided for emergency operation of the steering column in which a transmission of a steering angle from the steering wheel via the steering tube can be transmitted directly to the steering gear. During emergency operation, the first steering angle corresponds to the second steering angle. In the decoupling position, the steering gear connection and steering tube are rotatable relative to one another. The decoupling position is provided for the normal operation of the transportation vehicle, wherein the normal operation exhibits two operating modes, specifically a steer-by-wire operating mode, that is to say an operating mode in which a first steering angle predefined by the steering wheel is transmitted in a mechanically decoupled manner to the steering gear, and the autonomous operating mode, in which the steering wheel is completely decoupled from the steering gear and the first steering angle is irrelevant for the control of the transportation vehicle. In the steer-by-wire operating mode, provision may be made for the first steering angle to correspond to the second steering angle. A direction of change of the first steering angle may correspond to the direction of change of the second steering angle, such that the first steering angle and the second steering angle differ by a positive factor that differs from 1. Thus, an adjustment of the first steering angle can, for example, effect a relatively small or relatively large adjustment of the second steering angle. The differentiating factor may be set in a manner dependent on a transportation vehicle speed, such that, with increasing speed, an adjustment of the first steering angle effects a smaller adjustment of the second steering angle.

The first actuator device is designed for rotating the steering tube about the steering tube axis and thus for adjusting the first steering angle. In this way, by the first actuator device, it is, for example, possible for a force feedback in the steer-by-wire operating mode to be transmitted to the steering tube and thus the steering wheel. This means that, during driving, forces exerted by the road on the wheels of the transportation vehicle can thus be made perceptible to the driver. It is optional here for an intensity of these transmitted forces to be lower than the forces that would actually have been transmitted in the case of a rigid mechanical coupling of steering gear and steering tube. In this way, an excessive burden on the driver is avoided, and driving comfort is increased. Furthermore, it is possible by the first actuator device to adapt the first steering angle to the second steering angle by rotation of the steering tube.

The first steering angle is detectable by the first steering angle sensor, and the second steering angle is detectable by the second steering angle sensor. The control device is designed to control the first actuator device and the steering gear clutch. The control device is in this case designed to determine the first steering angle by the first steering angle sensor and the second steering angle by the second steering angle sensor. Furthermore, the control device is designed to control the first actuator device in open-loop or closed-loop state such that the first steering angle is adapted to the second steering angle. Finally, the control device is designed to adjust the steering gear clutch into the coupling position if the first steering angle and the second steering angle correspond to one another.

The disclosed multifunctional steering column is more beneficial than conventional steering columns that three operating modes can be realized, specifically a steer-by-wire operating mode, an autonomous operating mode and an emergency operating mode. By the first actuator device and the control device, it is possible in the steer-by-wire operating mode for a force feedback on the steering tube to be simulated to provide the driver with a realistic steering feel which reflects or at least partially reflects forces exerted by the road on the steering system. In the autonomous operating mode, mechanical decoupling of the steering tube from the steering gear can be achieved which is such that a change of the second steering angle does not effect a change of the first steering angle. In the emergency operating mode, the steering tube and steering gear connection are mechanically coupled to one another such that a change of the first steering angle effects a corresponding change of the second steering angle. The disclosed steering column has the further benefit that a reliable switchover from the autonomous operating mode into the steer-by-wire operating mode and into the emergency operating mode is possible even if the second steering angle differs from 0°, that is to say the transportation vehicle is not traveling straight ahead. The driver can accordingly safely resume control of the transportation vehicle even during cornering.

In a disclosed embodiment, provision may be made, in the case of a steering column, for the first actuator device to have a first electric motor and a first planetary gearing, wherein the first electric motor is mechanically coupled by the first planetary gearing to the steering tube such that the steering tube is rotatable by the first actuator device about the steering tube axis. The first planetary gearing may be mechanically coupled by a first belt drive, in particular, a toothed belt drive, to the steering tube. The first actuator device may be designed to transmit torques of between 20 and 40 Nm to the steering tube. A first actuator device of the type has a compact and robust construction and permits a fast adjustment of the first steering angle. Therefore, such a first actuator device is suitable for a steering column.

The steering tube may have an upper steering tube and a lower steering tube, wherein the upper steering tube and the lower steering tube are displaceable relative to one another along the steering tube axis. The steering column has a second actuator device for relative displacement of the upper steering tube relative to the lower steering tube. The control device is designed to control the second actuator device. Here, the control device may be designed to, during autonomous driving operation, move the first steering tube and the second steering tube together such that the steering wheel can be recessed in an instrument panel of the transportation vehicle. Thus, it is ensured using simple methods or mechanisms that the driver is provided with increased freedom of movement and thus improved driving comfort. Furthermore, by use of a multi-part steering tube, a better adaptation of a steering wheel position of the steering wheel relative to the driver, which is necessary for the steer-by-wire operating mode and the emergency operating mode, is possible.

The second actuator device may have a second electric motor, a second planetary gearing and a spindle drive, wherein the second electric motor is mechanically coupled by the second planetary gearing and the spindle drive to the upper steering tube or to the lower steering tube. The second planetary gearing may be mechanically coupled to the spindle drive by a second belt drive, in particular, a toothed belt drive. Such a second actuator device has a compact and robust construction and permits a fast relative displacement of upper steering tube and lower steering tube. Therefore, such a second actuator device is suitable for a steering column.

It is optional for the control device to be designed to control the first actuator device, when the steering gear clutch is set in the decoupling position, such that the first actuator device changes the first steering angle in a manner dependent on a change of the second steering angle. In this way, a realistic and reliable steer-by-wire operating mode, in the case of which the driver is provided with exact feedback of steering moments acting on the steering gear, is ensured using simple methods or mechanisms.

In a disclosed embodiment, the steering gear clutch is formed as a magnetic coupling. The magnetic coupling may be designed to transmit torques of at least 60 to 80 Nm. By use of a magnetic coupling, a fast and reliable adjustment between the coupling position and the decoupling position can be ensured using simple methods or mechanisms. This has the benefit that, if an emergency operation of the steering column is necessary, a rigid mechanical coupling of the steering wheel or of the steering wheel connection to the steering gear connection can be realized quickly through corresponding activation of the steering gear clutch.

The steering gear clutch may be designed such that the steering gear clutch is moved into the decoupling position when a control current is applied thereto and is automatically moved into the coupling position when the control current is withdrawn. In the normal operating mode, that is to say, for example, in the autonomous operating mode or in the steer-by-wire operating mode, the control current can be applied to the steering gear clutch to hold the latter in the decoupling position and thus prevent a direct transmission of torque between steering tube and steering gear. For the direct mechanical coupling of steering tube and steering gear, it is sufficient to deactivate the control current, because the steering gear clutch can in this way be automatically moved into the coupling position. For this purpose, provision may, for example, be made for the steering gear clutch to have a spring or the like for providing a restoring force which acts from the decoupling position into the coupling position. A steering gear clutch designed in this way, in particular, that it is moved automatically into the coupling position, in the event of an electrical failure, such that manual steering by the driver is possible in the emergency operating mode.

The control device may be designed to control the first actuator device, when the steering gear clutch is set in the coupling position, so as to boost a steering moment input via the steering wheel connection. In the coupling position, a direct transmission of torque between the steering tube and the steering gear is possible by the steering gear clutch. For the manual adjustment of the first steering angle and thus of the second steering angle, it is necessary in certain driving situations for high steering moments to be applied. The control device is in this case designed to detect a steering action, input via the steering wheel connection, of a driver of the transportation vehicle and to activate the first actuator device such that the first steering angle is changed in the direction of the steering action. In this way, the steering column can, using simple methods or mechanisms, be operated in the manner of a steering column with a steering moment booster.

According to a second disclosed embodiment, this is achieved by a transportation vehicle having a transportation vehicle body and having a control system for autonomous driving. The disclosed transportation vehicle has a multi-functional steering column according to the first disclosed embodiment. The steering wheel connection of the steering column is rotationally conjointly mechanically coupled to a steering wheel of the transportation vehicle. The steering gear connection is rotationally conjointly mechanically coupled to a steering gear input of a steering gear of the transportation vehicle for adjustment of a steering angle of steerable wheels of the transportation vehicle. The control system is designed for autonomous driving of the transportation vehicle. For this purpose, the control system may be designed with a third actuator device for introducing a steering moment into the steering gear or into a steering axle of the transportation vehicle. For the steer-by-wire operating mode, the control system may be designed to detect the first steering angle and correspondingly activate the third actuator device. For the autonomous operating mode, the control system is coupled to a sensor arrangement of the transportation vehicle for detecting surroundings of the transportation vehicle, to correspondingly activate the third actuator device to avoid collisions with other objects and to avoid an inadvertent departure from the roadway. It is additionally optional for the control system to be coupled to a navigation system of the transportation vehicle to correspondingly activate the third actuator device on the basis of route data from the navigation system and present position data. It is optional for the control device to be formed as part of the control system.

All of the benefits that have already been described with regard to the multifunctional steering column according to the first disclosed embodiment are obtained with the described transportation vehicle. In relation to conventional transportation vehicles, the disclosed embodiments provide simple, inexpensive methods and mechanisms having three operating modes that can be realized by the steering column, specifically a steer-by-wire operating mode, an autonomous operating mode and an emergency operating mode. By use of the first actuator device and the control device, it is possible in the steer-by-wire operating mode to simulate a force feedback on the steering tube to provide the driver with a realistic steering feel which reflects or at least partially reflects forces exerted by the road on the steering system. In the autonomous operating mode, mechanical decoupling of the steering tube from the steering gear can be achieved which is such that a change of the second steering angle does not effect a change of the first steering angle. In the emergency operating mode, the steering tube and steering gear connection are mechanically coupled to one another such that a change of the first steering angle effects a corresponding change of the second steering angle. The disclosed transportation vehicle has a reliable switchover from the autonomous operating mode into the steer-by-wire operating mode and into the emergency operating mode even if the second steering angle differs from 0°, that is to say the transportation vehicle is not traveling straight ahead. The driver can accordingly safely resume control of the transportation vehicle even during cornering.

A third disclosed embodiment provides a method for operating a disclosed transportation vehicle. The method has the following operations:

adjusting the second steering angle of the steering gear connection by the control system, detecting the second steering angle by the second steering angle sensor, detecting the first steering angle by the first steering angle sensor, rotating the steering tube about the steering tube axis by the first actuator device controlled by the control device, such that the first steering angle corresponds to the second steering angle, switching to a manual operating mode by the control system.

The steering gear clutch is, during the execution of the disclosed method, arranged in the decoupling position, such that a relative rotation of the steering gear connection with respect to the steering tube is possible. At the start of the execution of the disclosed method, the transportation vehicle is in the autonomous operating mode. In the autonomous operating mode, to steer the transportation vehicle, the second steering angle is adjusted by the control system. For this purpose, the control system may have a third actuator device, which may be activatable by the control device. Provision may be made according to the disclosed embodiments for the steering wheel, in this state, to be arranged in a retracted state to be recessed into an instrument panel of the transportation vehicle. In the retracted state, the first steering angle may be amounts to 0°. In this autonomous operating state, the second steering angle is detected by the second steering angle sensor. The detection of the second steering angle may be performed continuously or is repeated with such a frequency that a true actual state of the second steering angle is detected with adequate precision and in an ongoing manner during the operation of the transportation vehicle. Furthermore, the first steering angle is detected by the first steering angle sensor. The detection of the first steering angle may be performed continuously or is repeated with such a frequency that a true actual state of the first steering angle is detected with adequate precision and in an ongoing manner during the operation of the transportation vehicle. It is optional for a detection of the first steering angle and of the second steering angle to be performed simultaneously or substantially simultaneously, such that an equalization of the first steering angle with the second steering angle is easily possible.

The steering wheel, during this time, may be automatically adjusted by the control device and the second actuator device and possibly a further actuator device, in particular, for pivoting the steering tube relative to the steering bracket, into a steering position. In the steering position, the steering wheel is arranged for manual use by the driver of the transportation vehicle. For adaptation of the first steering angle, that is to say of a relative rotational position of the steering wheel with respect to the steering bracket, the steering tube is rotated about the steering tube axis by the first actuator device controlled by the control device. The rotation is performed such that the first steering angle is adapted to the second steering angle until the first steering angle corresponds to the second steering angle.

In the context of the disclosed method, provision may be made for the first steering angle to be adapted continuously to further changes in the second steering angle. Finally, a switchover to the manual operating mode is performed by the control system. During the switchover, the first steering angle may correspond to the second steering angle. A correspondence of the first steering angle and of the second steering angle is to be understood in the context of the disclosure to mean that the first steering angle has a relationship with respect to the second steering angle which is configured for manual steering of the transportation vehicle in the respective driving situation. This may thus mean that the first steering angle is equal to the second steering angle. Furthermore, this may mean that the first steering angle may be multiplied by a positive factor to obtain the second steering angle, wherein the factor may be speed-dependent such that it decreases with increasing speed. The manual operating mode is to be understood to mean the steer-by-wire operating mode. The steering tube and the steering gear are coupled to one another such that, in the case of an adjustment of the first steering angle, the second steering angle is adjustable by the third actuator device, and, in the case of an adjustment of the second steering angle, the first steering angle is adjustable by the first actuator device. The adjustment may be performed by the control system. As an alternative to this, the switchover to the manual operating mode may also be performed by an adjustment of the steering gear clutch into the coupling position, such that the steering tube and the steering gear are mechanically directly coupled to one another.

All of the benefits that have already been described with regard to the disclosed steering column according to the first embodiment and the disclosed transportation vehicle according to the second embodiment are obtained with the described method. Accordingly, disclosed the method provides simple, inexpensive methods and mechanisms, a reliable switchover from an autonomous operating mode into the steer-by-wire operating mode and into the emergency operating mode is possible even if the second steering angle differs from 0°, that is to say the transportation vehicle is not traveling straight ahead. The driver can accordingly safely resume control of the transportation vehicle even during cornering.

Figure 2:
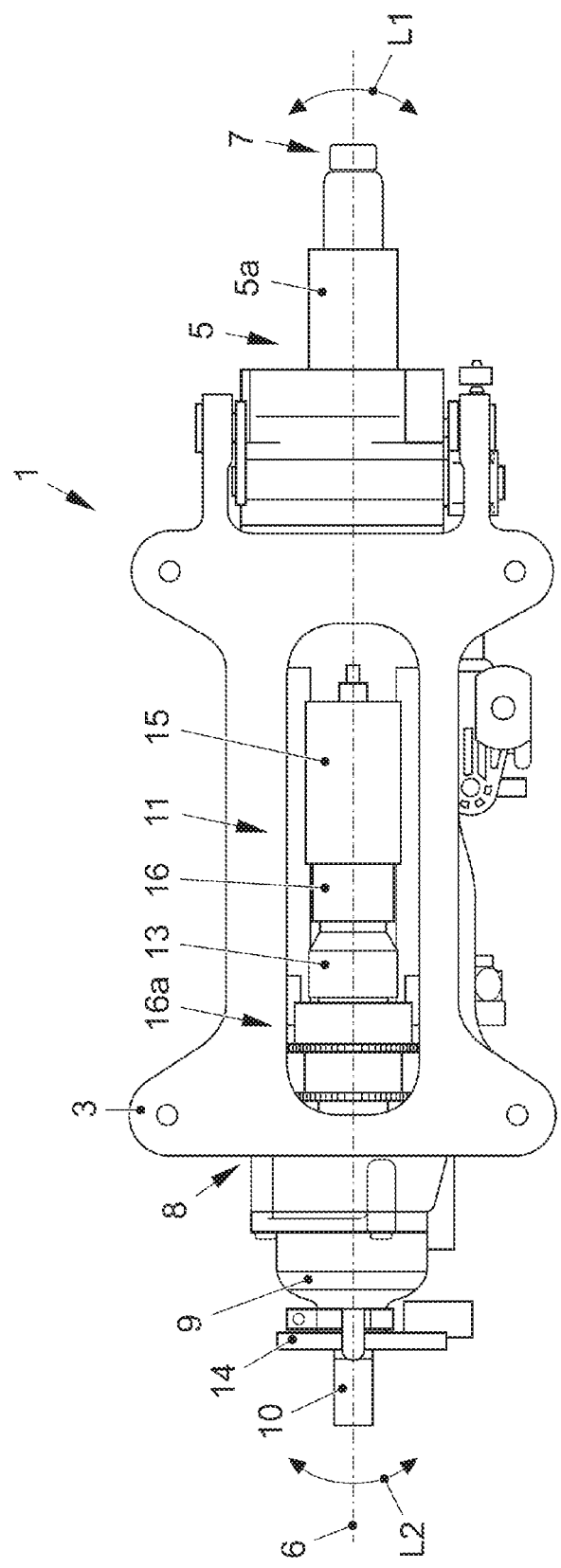
FIG. 2 shows a plan view from above of the steering column of FIG. 1.

FIG. 1 schematically illustrates an exemplary embodiment of a multifunctional steering column 1 in a plan view from below. FIG. 2 shows the same steering column 1 schematically in a plan view from above. The steering column 1 has a steering bracket 3 which is designed for connection of the steering column 1 to a transportation vehicle body 4 of a transportation vehicle 2 (cf. FIG. 7). A steering tube 5 of the steering column 1 is held pivotably on the steering bracket 1. The steering tube 5 has an upper steering tube 5 $a$ and a lower steering tube 5 $b$ with a common steering tube axis 6, wherein the upper steering tube 5 $a$ can be at least partially slid into the lower steering tube 5 $b$. At an end averted from the lower steering tube 5$b$, the upper steering tube 5 $a$ has a steering wheel connection 7 for the connection of a steering wheel (not illustrated) of the transportation vehicle 2. At an end averted from the upper steering tube 5 $a$, the lower steering tube 5 $b$ has a steering gear end 8 at which a steering gear coupling 9 formed as a magnetic coupling is arranged. On an end averted from the steering tube 5, the steering gear coupling 9 has a steering gear connection 10 which is designed for the connection of a steering gear 23 of the transportation vehicle 2.

FIG. 2 shows a first actuator device 11 which is designed for rotating the steering tube 5 about the steering tube axis 6. For this purpose, the first actuator device 11 has a first electric motor 15 which is mechanically coupled synchronously in terms of rotation to the steering tube 5 by a first planetary gearing 16 and a first belt drive 16$a$. At the belt drive 16$a$, there is arranged a first steering angle sensor 13 for detecting a first steering angle L1 of the steering tube 5. In a neutral position, in which the steering tube 5 is arranged for straight-ahead driving, the first steering angle L1 is 0°. The first steering angle L1 is adjustable in targeted state by the first actuator device 11. FIG. 1 shows a second actuator device 17 by which the upper steering tube 5$a$ is adjustable relative to the lower steering tube 5$b$ along the steering tube axis 6. The second actuator device 17 has a second electric motor 18, which is mechanically coupled by a second planetary gearing 19 and a second belt drive 19$a$ to a spindle drive 20. The spindle drive 20 is coupled to the upper steering tube 5$a$ for axial displacement of the upper steering tube 5$a$. At the steering gear connection 10, there is arranged a second steering angle sensor 14 for detecting a second steering angle L2 of the steering gear connection 10.

Figure 3:
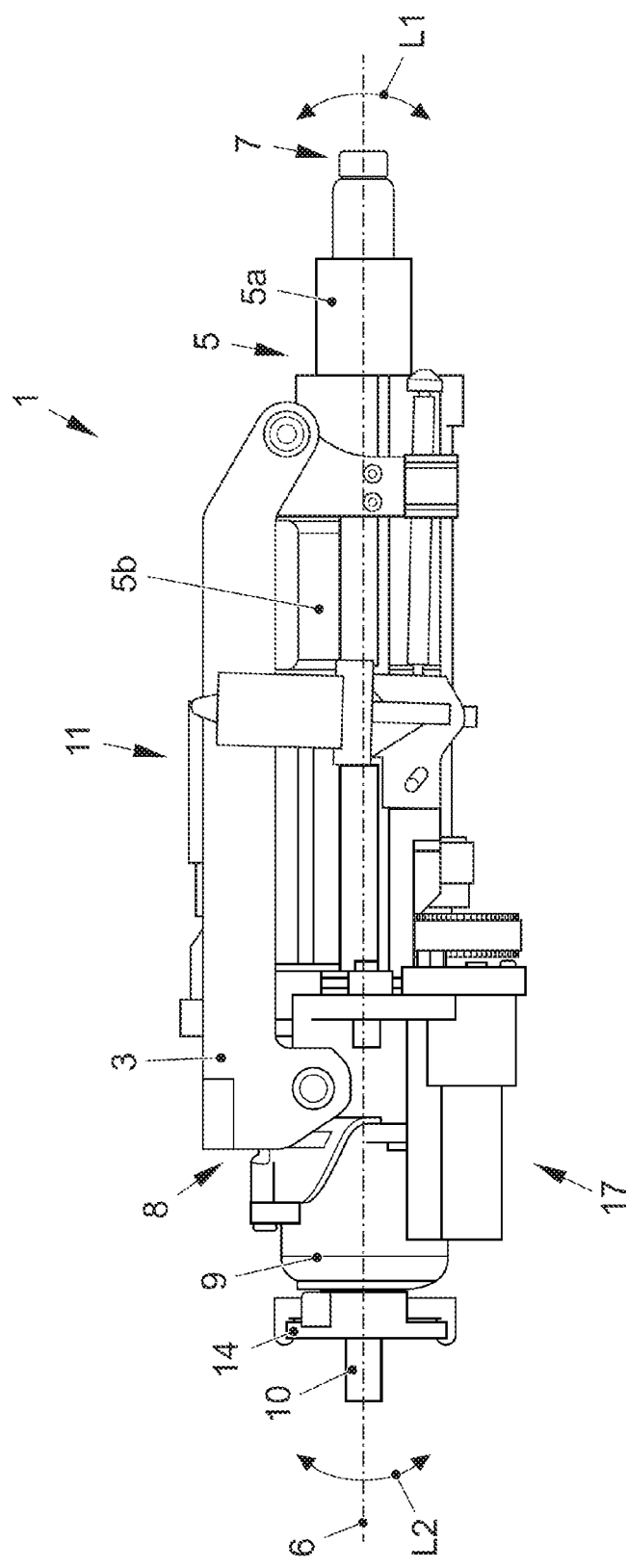
FIG. 3 shows a side view of the steering column of FIG. 1 in a retracted position.
Figure 4:
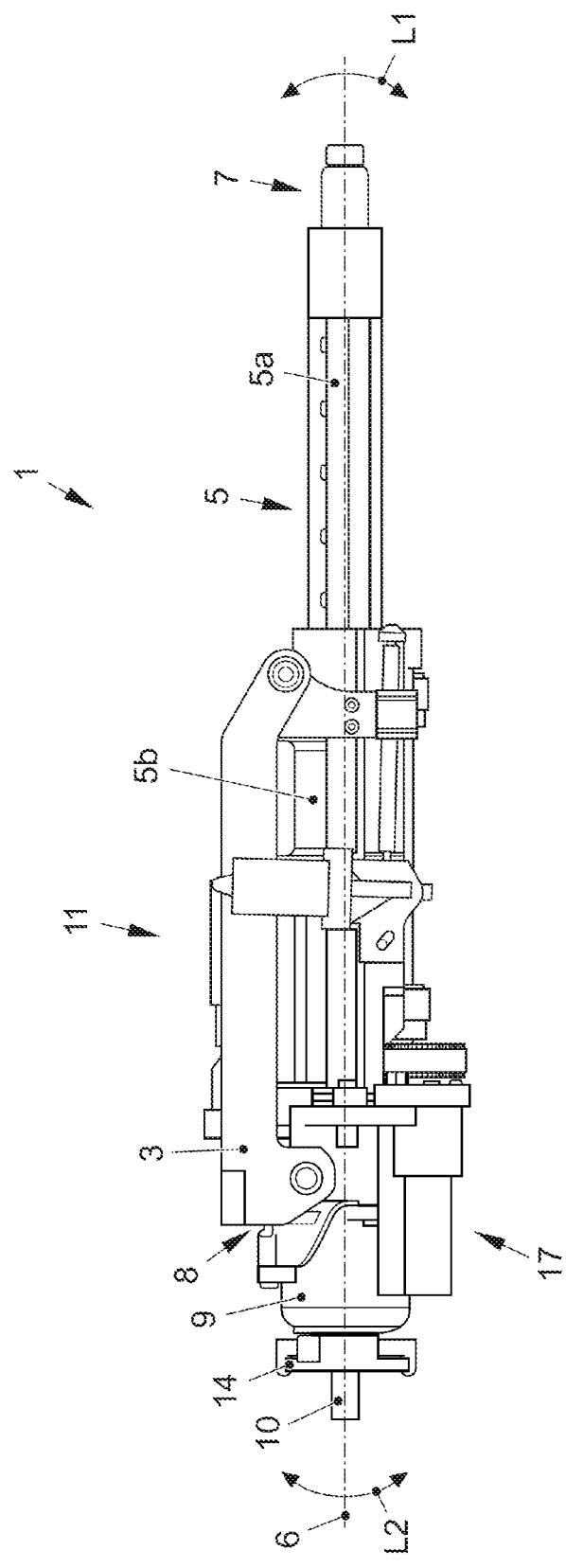
FIG. 4 shows a side view of the steering column of FIG. 1 in an extended position.

FIG. 3 schematically illustrates the steering column 1 from FIG. 1 in a retracted position in a side view. FIG. 4 shows the steering column 1 in an extended position. In the retracted position, a major part of the upper steering tube 5$a$ is arranged in the lower steering tube 5$b$. This retracted position may be assumed, for example, to recess the steering wheel in an instrument panel of the transportation vehicle 2 to provide the driver with the largest possible free space in the autonomous operating mode of the transportation vehicle. The movement between the retracted position and the extended position is possible by the second actuator device 17, which is controllable by a control device 12 (cf. FIG. 7). In the extended position, the upper steering tube 5$a$ is extended out of the lower steering tube 5$b$ to a maximum extent.

Figure 5:
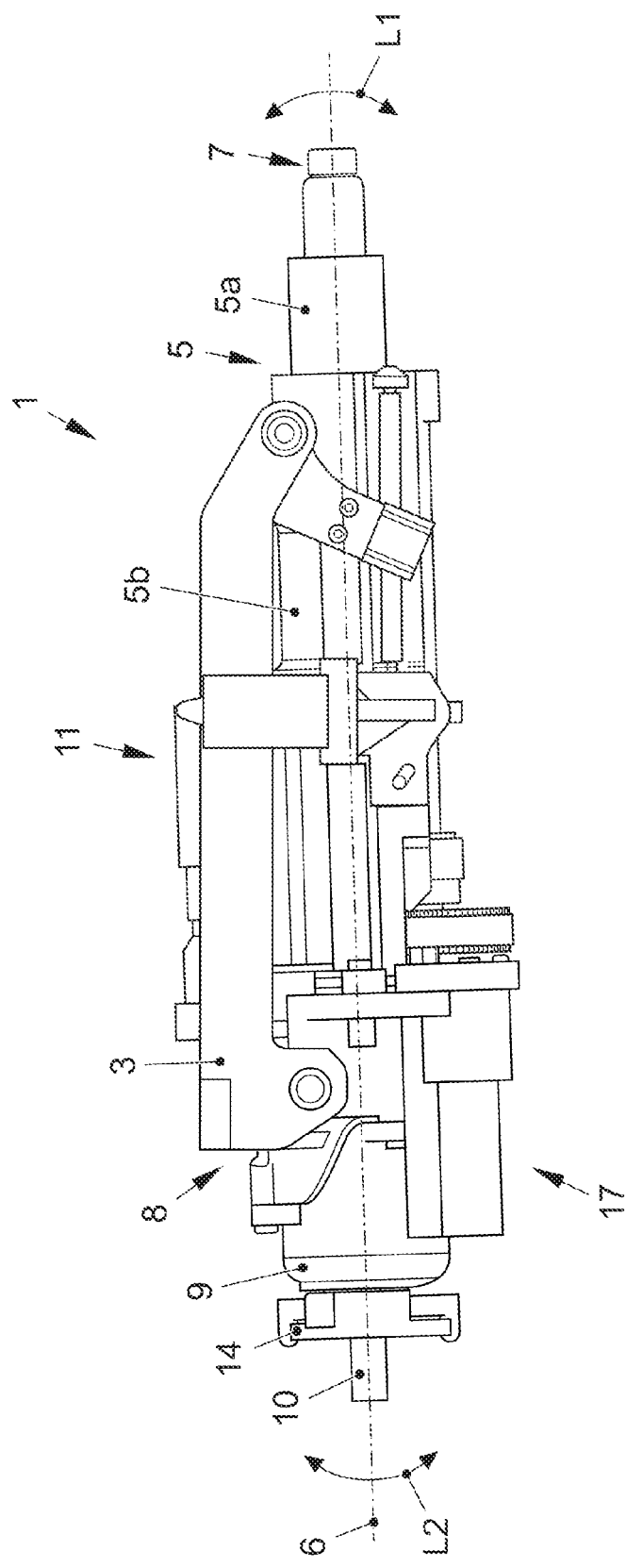
FIG. 5 shows a side view of the steering column of FIG. 1 in an upper position.
Figure 6:
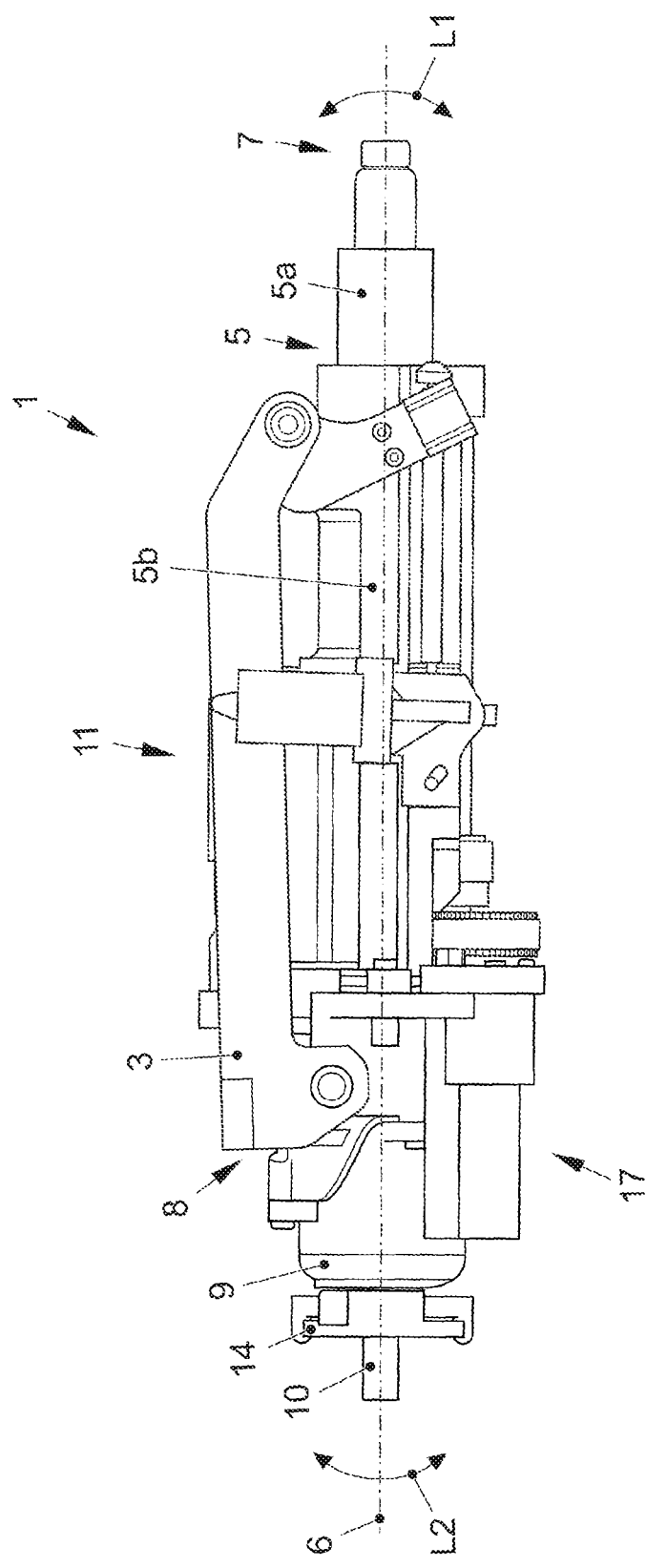
FIG. 6 shows a side view of the steering column of FIG. 1 in a lower position.

FIG. 5 shows the steering column from FIG. 1 in an upper position, and FIG. 6 shows the steering column 1 in a lower position. In the upper position, the upper steering tube 5$a$ has been pivoted, about a pivot axis perpendicular to the steering tube axis 6, to a maximum extent toward the steering bracket 3. The upper position is, for example, suitable for tall drivers. In the lower position, the upper steering tube 5$a$ has been pivoted away from the steering bracket 3 to a maximum extent about the pivot axis perpendicular to the steering tube axis 6. The lower position is suitable, for example, for short drivers. For the pivoting between the lower position and the upper position, the steering column 1 may have a further actuator device (not illustrated) which may have an internal resistance by which it can be ensured that a selected position is maintained when the further actuator device is not activated. The further actuator device may be controllable by the control device 12.

Figure 7:
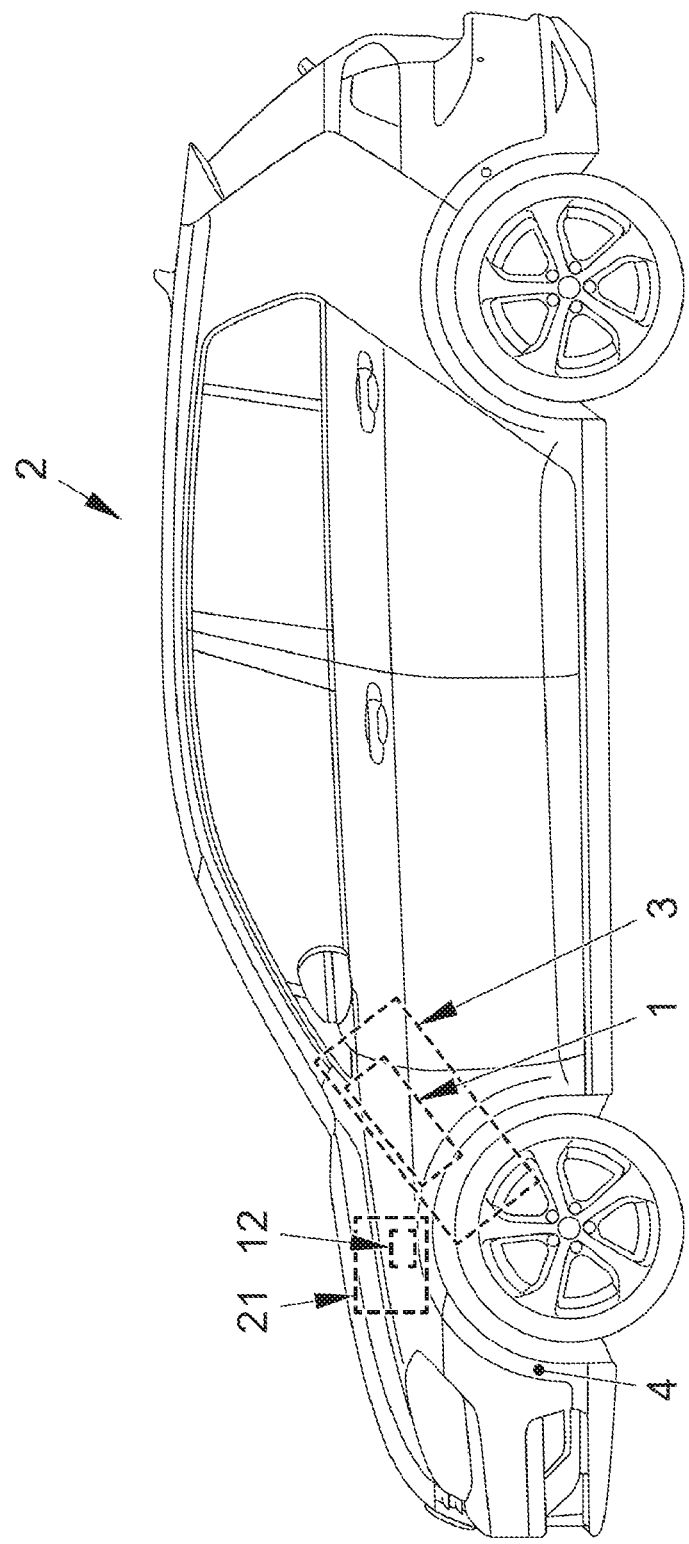
FIG. 7 shows a side view of an exemplary embodiment of a disclosed transportation vehicle.

FIG. 7 schematically shows a disclosed embodiment of a transportation vehicle 2 in a side view. The transportation vehicle 2 has a transportation vehicle body 4 and a steering column 1 with a control device 12. The control device 12 is designed for controlling mechanical components of the steering column and for evaluating the first steering angle L1 detected by the first steering angle sensor 13 and the second steering angle L2 detected by the second steering angle sensor 14. The steering column 1 is fixed by its steering bracket 3 to the transportation vehicle body 4. The transportation vehicle 2 furthermore has a control system 21 for controlling the transportation vehicle 2 in an autonomous operating mode. In this exemplary embodiment, the control device 12 is formed as part of the control system 21.

Figure 8:
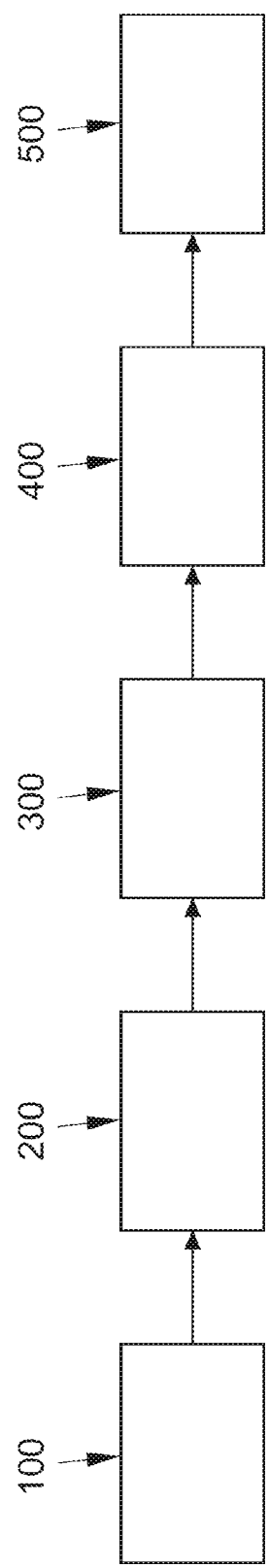
FIG. 8 shows a flow diagram of an exemplary embodiment of the disclosed method.

FIG. 8 shows an exemplary embodiment of the disclosed method in a flow diagram. In a first method operation at 100, in the autonomous operating mode of the transportation vehicle 2, the second steering angle L2 of the steering gear connection 10 is adjusted by the control system 21. The transportation vehicle 2 is steered in this way. In a second method operation at 200, the second steering angle L2 is detected by the second steering angle sensor 14. The detection has the benefit that the adjustment of the second steering angle L2 can be performed in an exact manner in this way. In a third method operation at 300, the first steering angle L1 is detected by the first steering angle sensor 13. The detection of the first steering angle L1 and/or of the second steering angle L2 may be performed repeatedly or continuously. In a fourth method operation at 400, the steering tube 5 is rotated about the steering tube axis 6 by the first actuator device 11 controlled by the control device 12, such that the first steering angle L1 corresponds to the second steering angle L2. In a fifth method operation at 500, a switchover to a manual operating mode of the transportation vehicle 2 is performed by the control system 21. In this state, a change of the second steering angle L2 is possible by adjustment of the first steering angle L1.

LIST OF REFERENCE DESIGNATIONS

1 Steering column
2 Transportation vehicle
3 Steering bracket
4 Transportation vehicle body
5 Steering tube
5$a$ Upper steering tube
5$b$ Lower steering tube
6 Steering tube axis
7 Steering wheel connection
8 Steering gear end 9 Steering gear clutch
10 Steering gear connection
11 First actuator device
12 Control device
13 First steering angle sensor
14 Second steering angle sensor
15 First electric motor
16 First planetary gearing
16a First belt drive
17 Second actuator device
18 Second electric motor
19 Second planetary gearing
19a Second belt drive
20 Spindle drive
21 Control system
100 First method operation
200 Second method operation
300 Third method operation
400 Fourth method operation
500 Fifth method operation
L1 First steering angle
L2 Second steering angle

The invention claimed is:

1. A multifunctional steering column for a transportation vehicle, the steering column comprising:
   a steering bracket to connect the steering column to a transportation vehicle body of the transportation vehicle;
   a steering tube held on the steering bracket which has a steering tube axis;
   a steering wheel connection for mechanical coupling of the steering column to a steering wheel; and
   a steering gear end, at which a steering gear clutch with a steering gear connection for magnetic coupling to a steering gear of the transportation vehicle is arranged, a first actuator device to adjust a first steering angle of the steering wheel connection about the steering tube axis relative to the steering bracket,
   a control device for controlling the first actuator device, wherein the steering gear clutch is integrally formed with the steering tube and magnetically couples the steering tube to the steering gear of the transportation vehicle for an emergency operation and the steering gear clutch magnetically decouples the steering tube from the steering gear of the transportation vehicle so that the steering tube and steering gear rotate relative to each other for a normal operation, the normal operation having two operating modes, a steer-by-wire operating mode and an autonomous operating mode,
   wherein the steering gear clutch decouples from the steering gear to prevent direct transmission of a torque between the steering tube and the steering gear when a control current is applied thereto by the control device and automatically couples the steering tube and steering gear when the control current is withdrawn,
   wherein the steering column has a first steering angle sensor for detecting the first steering angle of the steering wheel connection about the steering tube axis and a second steering angle sensor for detecting a second steering angle of the steering gear connection about the steering tube axis,
   wherein the control device controls the first actuator device so the first steering angle is continuously adapted to the second steering angle in the normal operation, and
   wherein the control device adjusts the steering gear clutch-in response to the first steering angle corresponding to the second steering angle.

2. The steering column of claim 1, wherein the first actuator device has a first electric motor and a first planetary gearing, wherein the first electric motor is mechanically coupled by the first planetary gearing to the steering tube so the steering tube is rotatable by the first actuator device about the steering tube axis.

3. The steering column of claim 1, wherein the control device controls the first actuator device when the steering gear coupling is set in the decoupling position, so the first actuator device changes the first steering angle dependent on a change of the second steering angle.

4. The steering column of claim 1, wherein the control device controls the first actuator device when the steering gear coupling is set in the coupling position to boost a steering moment input via the steering wheel connection.

5. The steering column of claim 1, wherein the steering tube has an upper steering tube and a lower steering tube, wherein the upper steering tube and the lower steering tube are displaceable relative to one another along the steering tube axis, wherein the steering column has a second actuator device for relative displacement of the upper steering tube with respect to the lower steering tube, and wherein the control device controls the second actuator device.

6. The steering column of claim 5, wherein the second actuator device has a second electric motor, a second planetary gearing and a spindle drive, wherein the second electric motor is mechanically coupled by the second planetary gearing and the spindle drive to the upper steering tube or to the lower steering tube.

7. A transportation vehicle having a transportation vehicle body and a control system for autonomous driving, wherein the transportation vehicle has a multifunctional steering column that includes:
   a steering bracket to connect the steering column to a transportation vehicle body of the transportation vehicle;
   a steering tube held on the steering bracket which has a steering tube axis;
   a steering wheel connection for mechanical coupling of the steering column to a steering wheel; and
   a steering gear end, at which a steering gear clutch with a steering gear connection for magnetic coupling to a steering gear of the transportation vehicle is arranged, the steering gear clutch having a first actuator device to adjust a first steering angle of the steering wheel connection about the steering tube axis relative to the steering bracket, and the steering gear coupling having a control device for controlling the first actuator device,
   wherein the steering gear clutch is integrally formed with the steering tube and magnetically couples the steering tube to the steering gear of the transportation vehicle for an emergency operation and magnetically decouples the steering tube from the steering gear of the transportation vehicle so that the steering tube and steering gear rotate relative to each other for a normal operation, the normal operation having two operating modes, a steer-by-wire operating mode and an autonomous operating mode,
   wherein the steering gear clutch decouples from the steering gear when a control current is applied thereto and automatically couples the steering tube to the steering gear when the control current is withdrawn,
   wherein the steering column has a first steering angle sensor for detecting the first steering angle of the steering wheel connection about the steering tube axis and a second steering angle sensor for detecting a second steering angle of the steering gear connection about the steering tube axis, wherein the control device controls the first actuator device so the first steering angle is continuously adapted to the second steering angle during the normal operation, and wherein the control device adjusts the steering gear clutch into the coupling position in response to the first steering angle corresponding to the second steering angle.

8. The transportation vehicle of claim 7, wherein the first actuator device has a first electric motor and a first planetary gearing, wherein the first electric motor is mechanically coupled by the first planetary gearing to the steering tube so the steering tube is rotatable by the first actuator device about the steering tube axis.

9. The transportation vehicle of claim 7, wherein the control device controls the first actuator device when the steering gear clutch decouples the steering tube from the steering gear, so the first actuator device changes the first steering angle dependent on a change of the second steering angle.

10. The transportation vehicle of claim 7, wherein the control device controls the first actuator device when the steering gear coupling is set in the coupling position to boost a steering moment input via the steering wheel connection.

11. The transportation vehicle of claim 7, wherein the steering tube has an upper steering tube and a lower steering tube, wherein the upper steering tube and the lower steering tube are displaceable relative to one another along the steering tube axis, wherein the steering column has a second actuator device for relative displacement of the upper steering tube with respect to the lower steering tube, and wherein the control device controls the second actuator device.

12. The transportation vehicle of claim 11, wherein the second actuator device has a second electric motor, a second planetary gearing and a spindle drive, wherein the second electric motor is mechanically coupled by the second planetary gearing and the spindle drive to the upper steering tube or to the lower steering tube.

13. A method for operating a transportation vehicle including a multifunctional steering column and a control system for autonomous driving, wherein the multifunctional steering column includes a steering bracket to connect the steering column to a transportation vehicle body of the transportation vehicle, a steering tube held on the steering bracket which has a steering tube axis, a steering wheel connection for mechanical coupling of the steering column to a steering wheel, and a steering gear end, at which a steering gear clutch with a steering gear connection for magnetic coupling to a steering gear of the transportation vehicle is arranged, a first actuator device to adjust a first steering angle of the steering wheel connection about the steering tube axis relative to the steering bracket, a control device for controlling the first actuator device, wherein the steering gear clutch magnetically couples the steering tube to the steering gear of the transportation vehicle in a coupling position and mechanically decouples the steering tube from the steering gear of the transportation vehicle in a decoupling position, wherein the steering gear clutch is integrally formed with the steering tube and magnetically couples the steering tube to the steering gear of the transportation vehicle for an emergency operation and the steering gear clutch magnetically decouples the steering tube from the steering gear of the transportation vehicle so that the steering tube and steering gear rotate relative to each other for a normal operation, the normal operation having two operating modes, a steer-by-wire operating mode and an autonomous operating mode, wherein the steering column has a first steering angle sensor for detecting the first steering angle of the steering wheel connection about the steering tube axis and a second steering angle sensor for detecting a second steering angle of the steering gear connection about the steering tube axis, wherein the method comprises:

adjusting the second steering angle of the steering gear connection by the control system;

detecting the second steering angle by the second steering angle sensor;

detecting the first steering angle by the first steering angle sensor;

continuously rotating the steering tube about the steering tube axis by the first actuator device controlled by the control device so the first steering angle corresponds to the second steering angle in the normal operation; and switching to a manual operating mode by the control system.

14. The method of claim 13, wherein the first actuator device has a first electric motor and a first planetary gearing, wherein the first electric motor is mechanically coupled by the first planetary gearing to the steering tube so the steering tube is rotatable by the first actuator device about the steering tube axis.

15. The method of claim 13, wherein the control device controls the first actuator device when the steering gear coupling is set in the decoupling position, so the first actuator device changes the first steering angle dependent on a change of the second steering angle.

16. The method of claim 13, wherein the steering gear coupling is designed so the steering gear coupling is moved into the decoupling position when a control current is applied thereto and is automatically moved into the coupling position when the control current is withdrawn.

17. The method of claim 13, wherein the control device controls the first actuator device when the steering gear coupling is set in the coupling position to boost a steering moment input via the steering wheel connection.

18. The method of claim 13, wherein the steering tube has an upper steering tube and a lower steering tube, wherein the upper steering tube and the lower steering tube are displaceable relative to one another along the steering tube axis, wherein the steering column has a second actuator device for relative displacement of the upper steering tube with respect to the lower steering tube, and wherein the control device controls the second actuator device.

19. The method of claim 18, wherein the second actuator device has a second electric motor, a second planetary gearing and a spindle drive, wherein the second electric motor is mechanically coupled by the second planetary gearing and the spindle drive to the upper steering tube or to the lower steering tube.

* * * * *